(12) United States Patent  
Fukuda et al.

(10) Patent No.: US 7,525,051 B2
(45) Date of Patent: Apr. 28, 2009

(54) SWITCH MECHANISM (75) Inventors: Kei Fukuda, Saitama (JP); Noriaki Yahata, Saitama (JP)

(73) Assignee: Valeo Thermal Systems Japan Corporation, Saitama (JP)

( * ) Notice: Subject to any disclaimer, the term of this patent is extended or adjusted under 35 U.S.C. 154(b) by 330 days.

(21) Appl. No.: 10/582,880

(22) PCT Filed: Sep. 30, 2004

(86) PCT No.: PCT/JP2004/014358

§ 371 (c)(1),
(2), (4) Date: Jun. 14, 2006

(87) PCT Pub. No.: WO2005/062324

PCT Pub. Date: Jul. 7, 2005

(65) Prior Publication Data

US 2007/0119697 A1  May 31, 2007

(30) Foreign Application Priority Data

Dec. 24, 2003  (JP) .............................. 2003-427977

(51) Int. Cl.
*H01H 9/00* (2006.01)
(52) U.S. Cl. ............................................. 200/4; 200/18
(58) Field of Classification Search .................... 200/4, 200/14, 18, 5 R, 11 R, 17 R, 336
See application file for complete search history.

(56) References Cited

U.S. PATENT DOCUMENTS 4,059,952 A * 11/1977 Kaestner ........................ 368/34
4,413,576 A * 11/1983 Taguchi ........................ 112/449
4,503,295 A *  3/1985 Whitten, Jr. ................. 200/35 R
7,348,503 B2 *  3/2008 Shiroyama et al. ............. 200/4

FOREIGN PATENT DOCUMENTS

JP        2001-229780 A        8/2001

(Continued)

OTHER PUBLICATIONS

International Search Report, No date.

*Primary Examiner*—Michael A Friedhofer
*Assistant Examiner*—Lisa N Klaus
(74) *Attorney, Agent, or Firm*—Rader, Fishman & Grauer, PLLC (57) ABSTRACT An object of the present invention is to provide a switch mechanism to be adopted in an air-conditioning system that may be operated manually, which allows a plurality of functions to be integrated therein and assures superior operability for the driver.

Manual switch mechanisms 1 and 3 are dial type mechanisms each comprising at least a tubular dial component 4 with open ends on the two sides thereof, a first gear 5 that is fitted on the outside of the dial component 4 so as to rotate together with the dial component and includes gear teeth 5a formed at the outer circumferential side surface thereof and a second gear 6 that includes gear teeth 6a formed at a circular arc circumferential surface thereof to which the rotation of the dial component 4 is transmitted from the first gear 5 via a relay component 7 and is connected through a wire 20 to drive an air-conditioning door. Inside the dial component 4, a push-button switch mechanism that includes at least a sliding component 8 that is slidably housed along the axis of the dial component 4 and includes a push portion 11 located at the bottom thereof and substrate having a switch portion 10 to contact the push portion 11, is fitted within the dial component 4.

2 Claims, 6 Drawing Sheets

FOREIGN PATENT DOCUMENTS

| JP | 2002-41164 A | 2/2002 |
| JP | 2002-172925 A | 6/2002 |
| JP | 2003-54245 A | 2/2003 |
| JP | 2003-267034 A | 9/2003 |

* cited by examiner

SWITCH MECHANISM

CROSS-REFERENCE TO RELATED APPLICATIONS

This application is the U.S. National Phase Application, under 35 USC 371 of International Application PCT/JP2004/014358, filed on Sep. 30, 2004, published as WO 2005/062324 A1 on Jul. 7, 2005, and claiming priority to JP 2003-427977, filed Dec. 24, 2003, the disclosures of all of which are incorporated herein by reference.

TECHNICAL FIELD

The present invention relates to a structure that may be adopted in a switch mechanism operated to manually control an air-conditioning system and, more specifically, an automotive air-conditioning system.

BACKGROUND ART

Switch mechanisms in automotive air-conditioning systems adopting a cable drive system in the known art include sliding switch mechanisms and knob switch mechanisms (see, for instance, patent reference literatures 1 and 2). Knob switch mechanisms that provide better operability and assure higher safety for driving than sliding switch mechanisms are preferred in most applications today (see, for instance, patent reference literature 3).
Patent reference literature 1: Japanese Unexamined Patent Publication No. 2003-54245
Patent reference literature 2: Japanese Unexamined Patent Publication No. 2002-172925
Patent reference literature 3: Japanese Unexamined Patent Publication No. 2002-41164

DISCLOSURE OF THE INVENTION

Problems to be Solved by the Invention

A push-button switch mechanism cannot be fitted in the main body of either a sliding switch mechanism or a knob switch mechanism and, for this reason, another switch mechanism, i.e., a push-button switch mechanism must be disposed near the sliding or knob switch mechanism. In other words, the switches are disposed at separate positions.

In addition, the driver needs to rotate the knob of a knob switch mechanism by a relatively large extent, sometimes exceeding the limit to the rotational angle achieved with ease simply by turning the wrist and arm. Since this is bound to force the driver to assume an unnatural posture, the operability is compromised and driving safety during the operation may become a concern.

Accordingly, an object of the present invention is to provide a switch mechanism to be adopted in an air-conditioning system, which allows a plurality of functions to be integrated therein and assures superior operability for the driver even when he adjusts the air-conditioning system manually.

Means for Solving the Problems

The switch mechanism according to the present invention, comprising at least a dial component that can be rotated, a first gear that is externally fitted at the outside of the dial component to rotate together with the dial component and includes a predetermined number of teeth formed at an external circumferential side surface thereof and a second gear that includes a predetermined number of teeth formed therein and drives a driven member connected thereto, includes a dial switch mechanism structure in which the rotation of the dial component is transmitted from the first gear to the second year via a relay component. The driven member may be an air-conditioning door, such as an output mode switching door or an air mix door. The second gear may assume a fan shape, with the predetermined number of teeth formed at a circumferential surface assuming the shape of a circular arc. In addition, the second gear and the air-conditioning door (the output mode switching door or the air mix door) may be connected with each other via a cable so as to open/close the air conditioning door through a manual cable drive system.

The dial component in the switch mechanism according to the present invention assumes a tubular shape with open ends on the two sides thereof, and a push-button switch mechanism that includes at least a sliding component slidably housed along the axis of the dial component and having a push portion located at the bottom thereof and a substrate having a switch portion to contact the push portion, is fitted inside the dial component.

The switch mechanism according to the present invention is further characterized in that an ON indicator member is housed inside the sliding component.

Effect of the Invention

According to the present invention, a dial type switch mechanism that can be turned simply with the fingertips is achieved. This switch mechanism assures superior operability and better safety for the driver, since, unlike a sliding switch mechanism that must be operated by shifting the arm by a great extent or a knob switch mechanism that must be operated by twisting the wrist or the upper arm, the switch mechanism according to the present invention can be operated without the driver having to change his posture.

In addition, according to the invention, the dial component in the dial switch mechanism is allowed to assume a hollow tubular shape with open ends by forming gear teeth at the first gear fitted on the outside of the dial component and disposing the relay component for transmitting the rotation of the dial component to the air-conditioning door at an offset position outside the dial component. As a result, the sliding component constituting the push-button switch mechanism can be housed in the space inside the dial component assuming the cylindrical shape so as to integrate the air-conditioning functions via the individual switch mechanisms. Furthermore, by forming a hollow space inside the sliding component as well, an ON indicator member can be housed inside the sliding component. Since the ratio of the area at the operating device taken up by the switch mechanisms and the ON indicator member can be reduced by adopting this structure, the degree of design freedom with regard to the layout on the operating device panel increases.

BRIEF DESCRIPTION OF THE DRAWINGS

FIG. 2(*a*) is a cut-away of part of the air conditioner operating device, viewed from a side and FIG. 2(*b*) shows part of the air conditioner operating device viewed from the case side;

EXPLANATION OF REFERENCE NUMERALS 1 switch mechanism
3 switch mechanism
4 dial component
4a gear teeth
5 first gear
5a gear teeth
6 second gear
6a gear teeth
7 relay component
7a gear
7b gear
8 sliding component
8a indicator component
8b base component
9 substrate
10 switch portion
11 push portion
15 panel
16 case
20 wire
24 hollow portion
25 LED lamp
26 indicator portion

BEST MODE FOR CARRYING OUT THE INVENTION

The following is an explanation of an embodiment of the present invention, given in reference to the drawings.

Switch mechanisms 1, 2 and 3 constituting part of an operating device operated to control, for instance, an automotive air-conditioning system are shown in FIGS. 1 through 9. The switch mechanism 1 is operated to select a specific output mode among various output modes, i.e., a defrost mode, a def/foot mode, a foot mode, a bi-level mode, a vent mode or an auto mode, and is also operated to switch from an outside air intake mode to an inside air intake mode or vice versa. The switch mechanism 2 is operated to switch the air blowing performance level and is also operated to turn ON/OFF the fan. The switch mechanism 3 is operated to select a specific temperature setting in the cabin and is also operated to turned ON/OFF AUTO control for automatically controlling the air-conditioning system.

Figure 3:
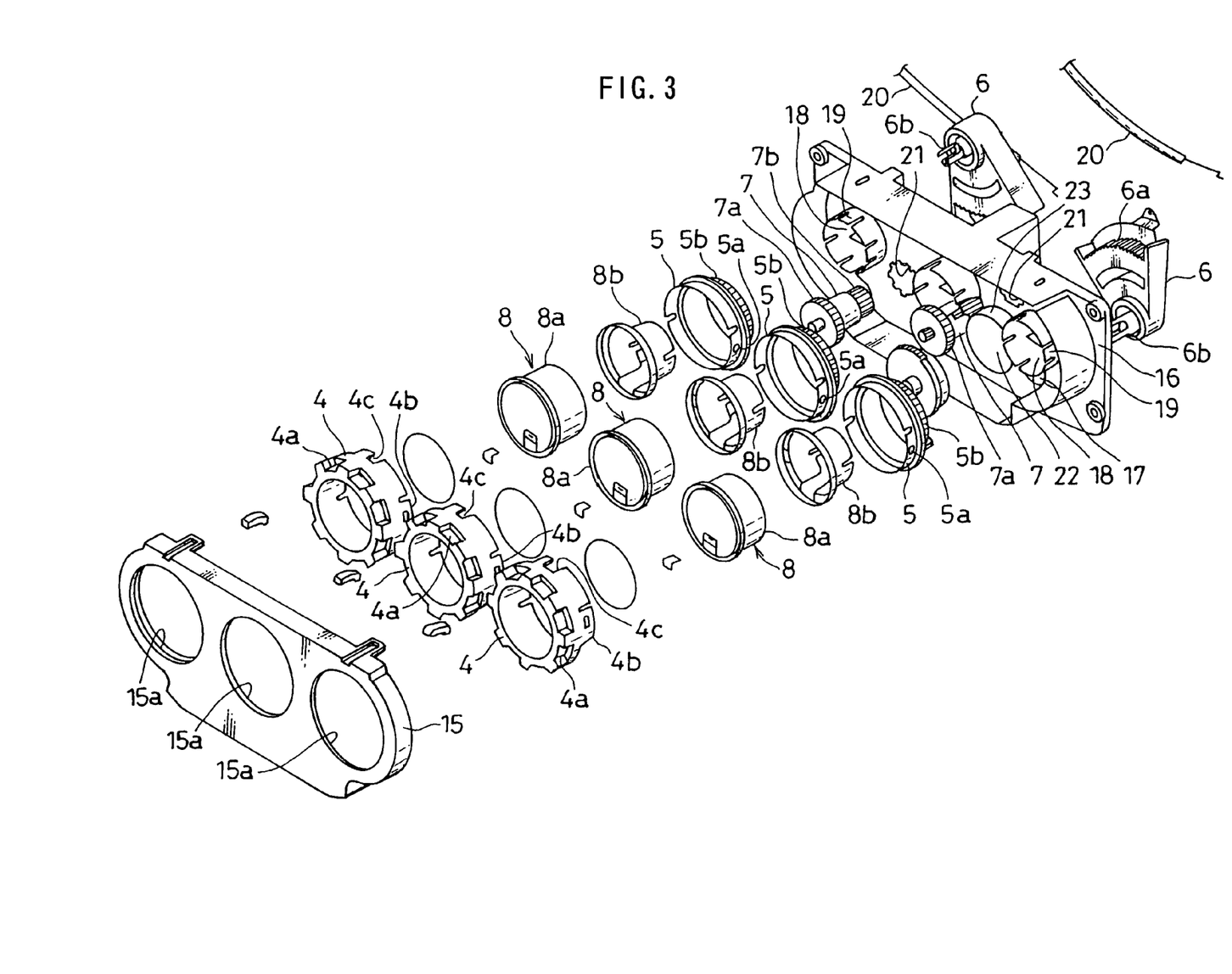
FIG. 3 is an exploded perspective of the air conditioner operating device.
Figure 4:
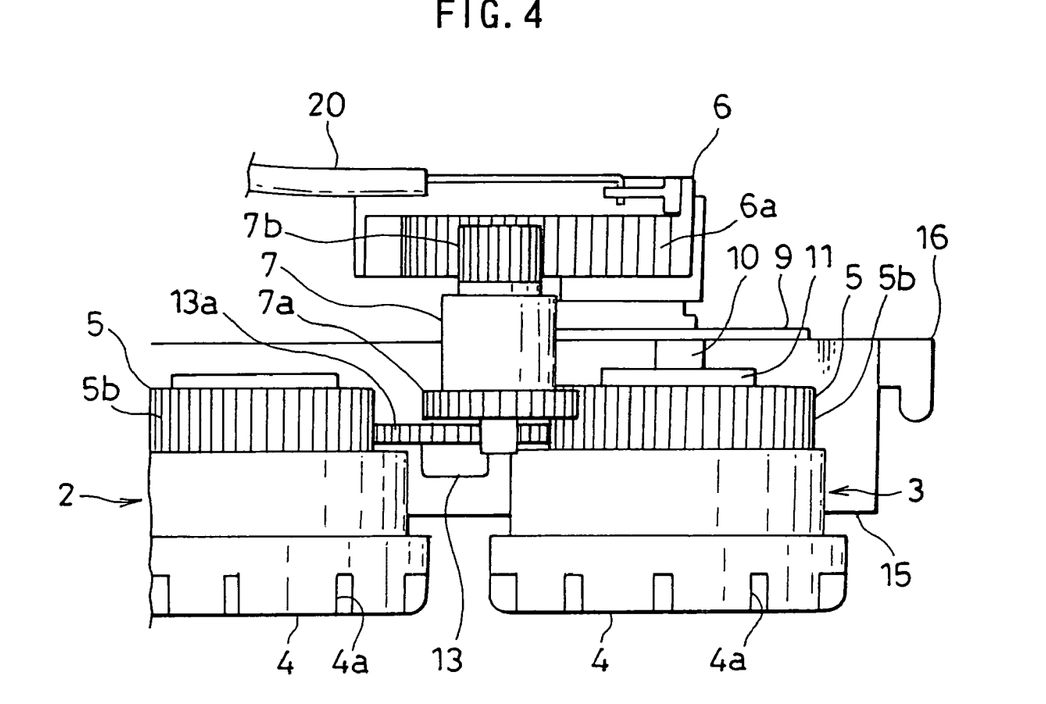
FIG. 4 is a side elevation showing the structure adopted in a switch mechanism according to the present invention.
Figure 6:
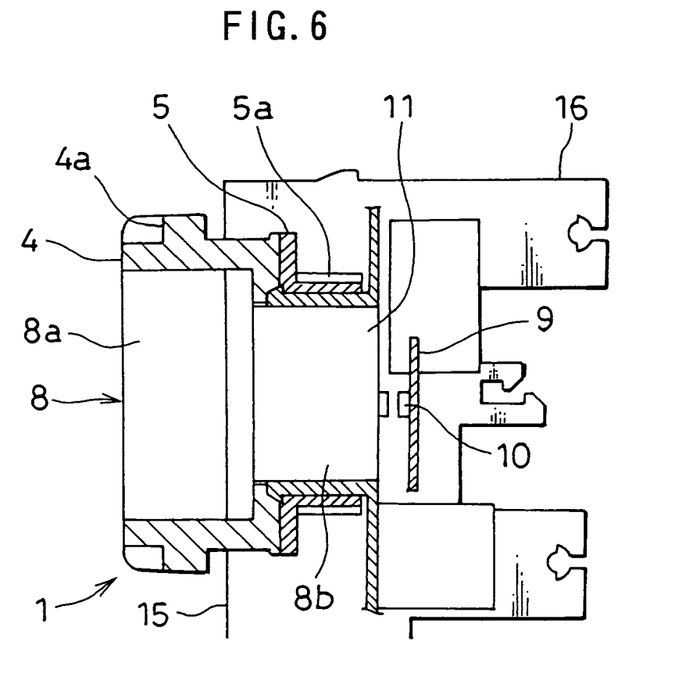
FIG. 6 is a sectional view showing the structure adopted in the sliding component in a switch mechanism according to the present invention.
Figure 7:
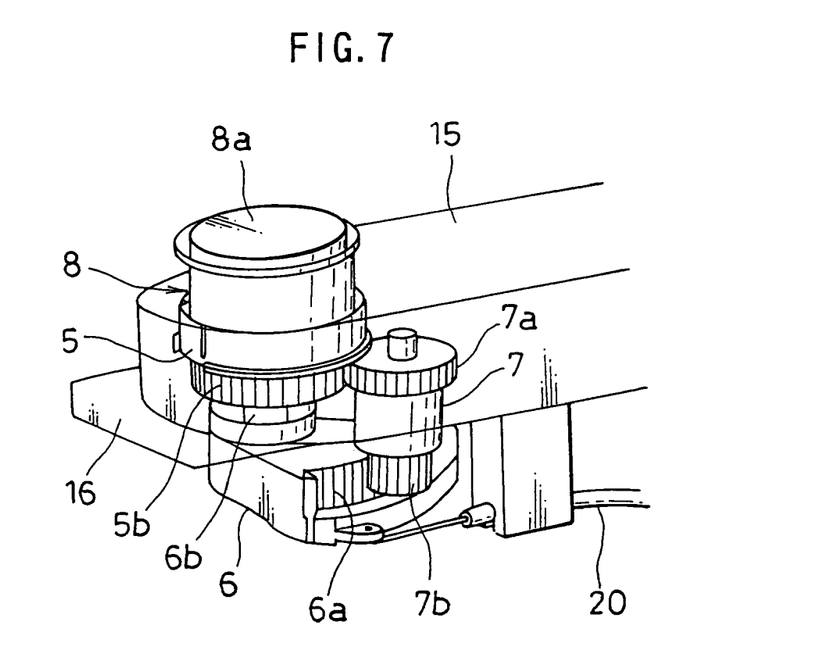
FIG. 7 is a partial perspective showing the structure of a switch mechanism according to the present invention.
Figure 8:
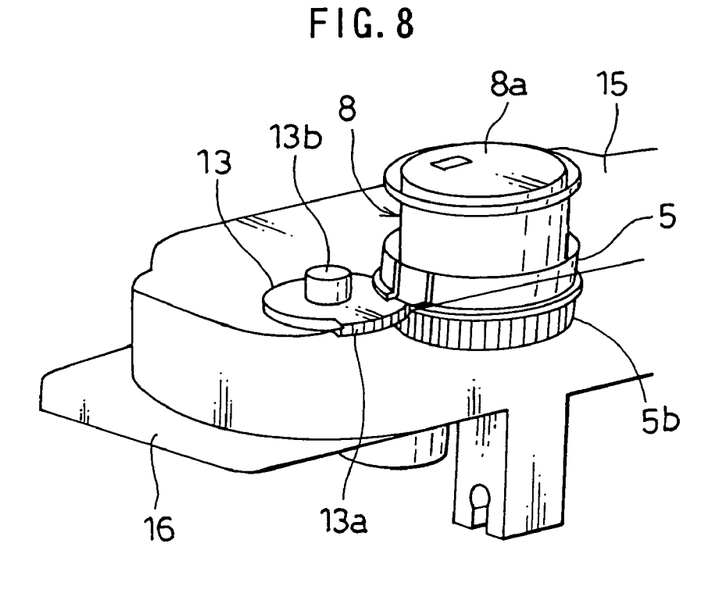
FIG. 8 is a partial perspective of the structure adopted in a switch mechanism utilized as a fan switch in an auto control system.

The switch mechanisms 1 and 3 are manual switch mechanisms and each include a dial component, a first gear 5, a second gear 6 and a relay component 7 constituting a dial switch mechanism and a sliding component 8 and a substrate 9 constituting a push-button switch mechanism, as shown in FIGS. 3 and 6. These components are mostly disposed between a panel 15 and a case 16 except for the second gear 6.

The dial component 4 assumes a tubular shape with open ends on the two sides thereof so as to allow the sliding component 8 to be inserted thereat and a ring-shaped surface 4a with indentations and projections is formed at an area near one of the open ends that projects out from a hole 15a at the panel 15 so that it can be held with fingers or the like for easy rotation, as shown in FIG. 3. At an area near the other open and of the dial component 4, a fitting hole 4b to fit with the first gear 5 projects out along the radial direction and notches 4c extending along the axis is formed as well.

Figure 1:
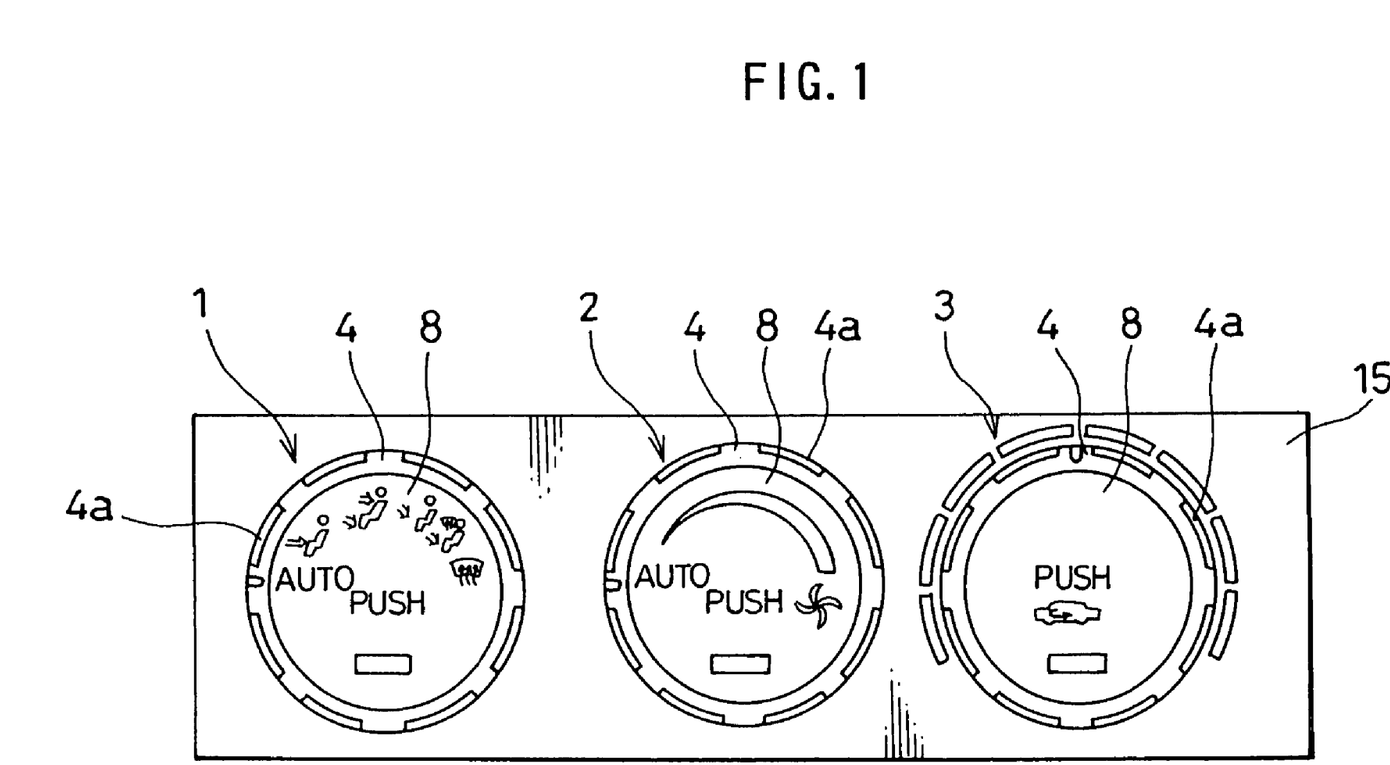
FIG. 1 shows part of an air-conditioner operating device viewed from the panel side.
Figure 2:
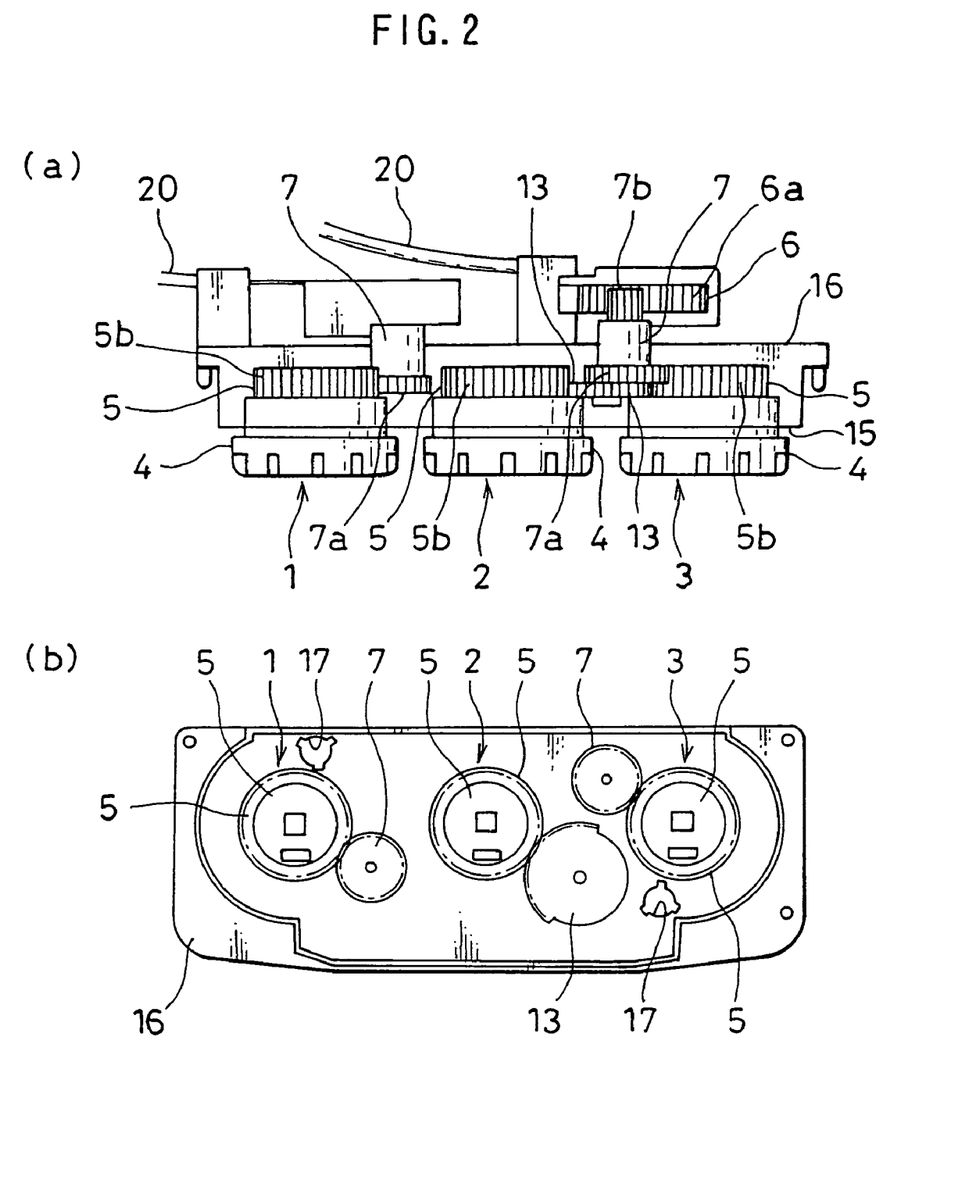

The sliding component 8 is constituted with an indicator component 8a, bearing indications with regard to the output mode settings or temperature setting selections, as shown in FIG. 1, and a base component 8b which includes a push portion 11 to be pushed to turned ON/OFF a switch 10 on a substrate 9. The sliding component is allowed to slide in two directions, i.e., the forward direction and the reverse direction, inside the dial component 4 along the axis thereof.

Figure 5:
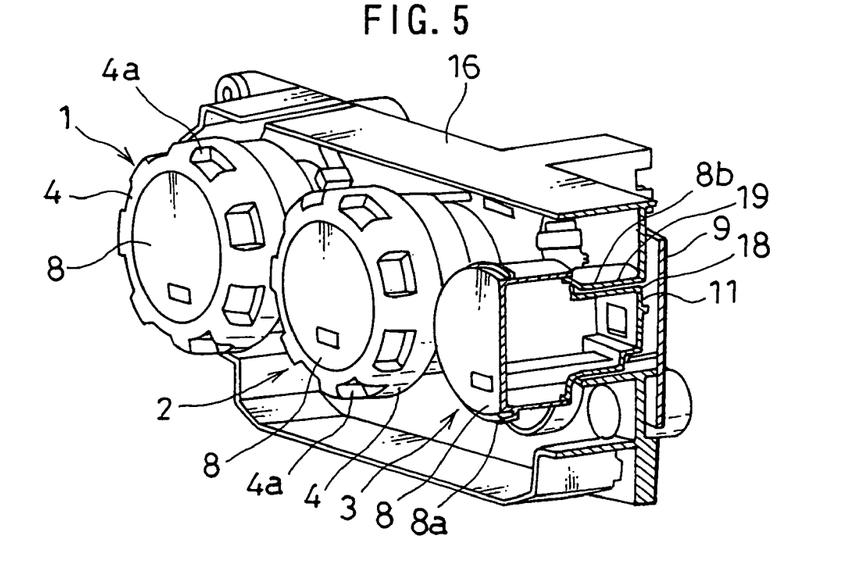
FIG. 5 is a sectional view showing the structure adopted in a switch mechanism according to the present invention.
Figure 9:
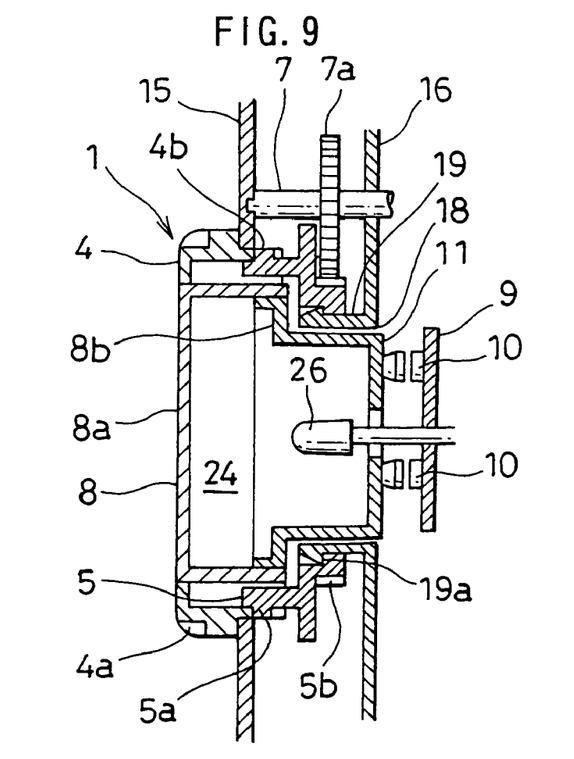
FIG. 9 is a sectional view of the switch mechanism with a LED lamp housed inside the sliding component according to the present invention.

The sliding component 8 in the embodiment is assembled as a component having a hollow portion 24 formed therein, as shown in FIGS. 5 and 9, by fitting the indicator component 8a, which includes an open side and assumes a cup shape with the base component 8b having an open side and assumes a cup shape. The indicator component and the base component are fitted together by setting their open sides to face opposite each other. In addition, as shown in FIGS. 3 and 5, the base component 8b has an outer diameter small enough to allow the base component to be housed inside a hole 18 formed at the case 16 and a tubular projection 19 ranging upright from the circumferential edge of the whole 18.

The first gear 5, fitted on the outer circumferential surface of the dial component 4, assumes a tubular shape with open ends on the two sides thereof. A projection 5a to fit in the fitting hole 4b at the dial component 4 is formed at an area near the open end toward the dial component, whereas a predetermined number of gear teeth 5b are formed in a circular formation at an area near the open end toward the side opposite from the dial component. The inner diameter of the openings at the first gear 5 is set greater than the outer diameter of the sliding component 8 and the outer diameter of the projection 19 so as to allow the sliding component 8 to be slidably inserted and allow the first gear to be fitted on the outside of the projection 19 at the case 16. As shown in FIG. 9, the projection 19 includes a hooking claw 19a turning inward at an open end thereof Thus, the projection can be rotatably engaged with the base member 8b.

The second gear 6, assuming a fan shape when viewed from above, includes a predetermined number of gear teeth 6a formed at the circular arc circumferential surface thereof and also includes a rotating shaft portion 6b projecting out on the base side opposite from the circular arc circumferential surface. As the rotating shaft portion 6b is inserted at a hole 17 formed at the case 16, as shown in FIG. 2(a), the second gear becomes able to rotate. The second gear 6 in the first switch mechanism transmits its rotation to the output mode switching door (not shown) via a wire 20 connected on the circular arc circumferential surface side, whereas the second gear 6 in the third switch mechanism transmits its rotation to the air mix door (not shown) via a wire 20 connected on the circular arc circumferential surface side.

The relay component 7, substantially assuming the shape of a shaft rod, includes a gear 7a formed at one end thereof to interlock with the gear teeth 5b at the first gear 5, which is, and a gear 7b to interlock with the gear teeth 6a at the second gear 6, which is formed at the other end. The rotation of the first gear 5 is thus transmitted to the second gear 6. This relay component 7 is rotatably inserted at a hole 21 formed at the case 16 with the gear 7b projecting out onto the opposite side at the case 16 during operation.

The switch mechanism 2, which is used in an auto control-type system, includes a dial component, a first gear 5 and a third gear 13 constituting a dial switch and a sliding component 8 constituting a push-button switch, as shown in FIG. 3. Most of these components, i.e., the components 4, 5 and 8 are identical to those in the switch mechanisms 1 and 3. In other words, the manual type switch mechanisms 1 and 3 are achieved by modifying the structure of the auto control-type switch mechanism 2. Namely, since parts constituting the switch mechanisms 1, 2 and 3 are mostly manufactured as universal components, the production cost can be reduced. The following explanation focuses on the structural arrangement unique to the switch mechanism 2 and the same reference numerals are assigned to components and structural features identical to those in the switch mechanisms 1 and 3 to preclude the necessity for a repeated explanation thereof.

The switch mechanism 2 is mainly used as a FAN switch and, unlike the switch mechanisms 1 and 3, it is not driven through a cable but instead it includes a dedicated third gear 13. The third gear 13, substantially assuming the shape of a shaft rod, includes gear teeth 13a formed at one end thereof to interlock with the gear teeth 5b at the first gear 5. The gear teeth 13a in the embodiment are formed over half the circumference of the gear 13 instead of the entire circumference of the gear 13. The outer diameter of the third gear 13 is small enough to allow the third gear 13 to be housed in a hole 22 formed at the case 16 and a tubular projection 23 ranging upright from the circumferential edge of the hole 22. It is to be noted that the indicator component 8a of the sliding component 8 bears markings related to the air blowing performance level selection, as shown in FIG. 1.

The switch mechanisms 1, 2 and 3 adopting the structure described above may be assembled through the following procedure. Namely, after installing a sliding member 8 constituted with the indicator member 8a and the base member 8b into the dial member 4, the first gear 5 is fitted on the outside of the dial member 4 until the projection 5a at the first gear 5 becomes fitted inside the hole 4b. As a result, the dial component 4 and the first gear 5 become able to rotate together and, at the same time, the sliding member 8 becomes allowed to slide over a specific range along the axial direction inside the hollow chamber defined by the dial component 4 and the first gear 5.

Next, the switch mechanisms 1 and 3 are assembled by rotatably inserting the relay component 7 at the hole 21 in the case 16 and rotatably fitting the first gear 5 coupled with the other components 4 and 8, on the outside of the projection 19. As a result, the dial component 4, the sliding component 8, the assembly of the first gear 5 and the relay component 7 are all mounted at the case 16 with the gear teeth 5a at the first gear 5 interlocking with the gear 7a at the relay component 7. In the assembled state, the relay component 7 assumes a position offset toward the outer circumference relative to the positions of the first gear 5 and the dial component 4.

The switch mechanism 2, on the other hand, is assembled by rotatably inserting the third gear 13 at the opening of the projection 22 at the case 16 and rotatably fitting the first gear 6, coupled with the other components 4 and 8, on the outside of the projection 19. As a result, the dial component 4, the sliding component 8, the assembly of the first gear 5 and the third gear 13 are all mounted at the case 16 with the gear teeth 5a at the first gear 5 interlocking with the gear teeth 13a at the third gear 13. In the assembled state, the third gear 13 assumes a position offset along the radial direction relative to the rotational center of the dial component 4, which allows the central shaft 13b at the third gear 13 to be used as a FAN switch.

Lastly, the rotating shaft portion 6b at the second gear 6 is rotatably inserted at the hole 17 in the case 16 on the side opposite from the side where the sliding component 8 and the like are present. The wire 20 with one end thereof connected to the output mode switching door or the air mix door is connected to the circular arc surface of the second gear 6. The panel 15 is fitted with the case 16 by ensuring that the individual holes 15a fit on the outside of the corresponding dial components 4, the panel and the case 16 are locked together with screws or the like and the substrate 9, which includes the switch portion 10, is disposed at the case 16 on the side toward the second gear 6.

The manual switch mechanisms 1 and 3 adopting the cable drive system each include a dial component 4 on the outside of which the first gear 5 is fitted. They also each include a relay member 7 offset toward the outer circumference side relative to the dial component 4 and the first gear 5 so as to allow a sliding component 8 constituting the push-switch mechanism to be fitted inside the dial component 4.

In the structure, the dial component 4 can be rotated with ease from any angle, thereby achieving an improvement in the operability for the driver over sliding switch mechanisms and knob switch mechanisms. In addition, unlike sliding switch mechanisms or knob switch mechanisms, the structure does not require a push-button switch to be disposed at the periphery and thus, the switches do not need to be disposed at separate positions. Furthermore, various functions such as air conditioner ON/OFF function and indicator functions can be integrated in a single switch mechanism 1 or 3. Since the rotating shaft of the relay member 7 is disposed at an offset position so as to circumscribe the first gear 5, the switch mechanisms 1 and 3 can be miniaturized.

It is to be noted that the sliding component 8 includes a hollow portion 24, as shown in FIG. 9. Accordingly, a LED lamp 25 (a light emitting diode in this embodiment) can be disposed in the hollow portion as necessary, and by disposing an indicator portion 26 at the indicator member 8a, the switch ON/OFF state can be indicated or the indicator portion can be lit at night to indicate the switch location.

The invention claimed is:

1. A switch mechanism, comprising at least:
   a dial component that rotates;
   a first gear that is fitted at the outside of said dial component to rotate together with said dial component and includes a predetermined number of teeth formed at an external circumferential side surface thereof;
   a second gear that includes a predetermined number of teeth formed therein and drives a driven member connected thereto;
   wherein said switch mechanism includes a dial switch mechanism structure in which the rotation of said dial component is transmitted from said first gear to said second gear via a relay component, and
   wherein said dial member assumes a tubular shape with open ends on the two sides thereof; and wherein a push-button switch mechanism that includes at least a sliding component slidably housed along the axis of said dial component and having a push portion located at the bottom thereof and a substrate having a switch portion to contact said push portion is fitted inside said dial component.

2. A switch mechanism according claim 1, wherein an ON indicator member is housed inside said sliding component.

* * * * *